Jan. 19, 1960 R. H. DAVID 2,921,808
ADJUSTABLE CONNECTIONS
Filed Oct. 30, 1956
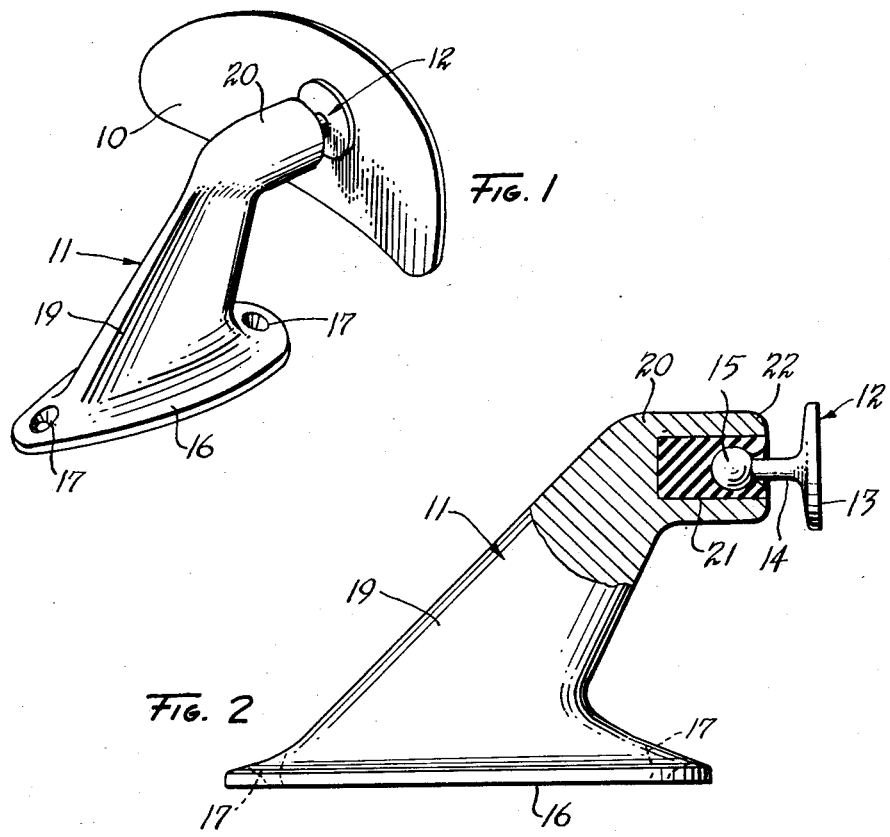
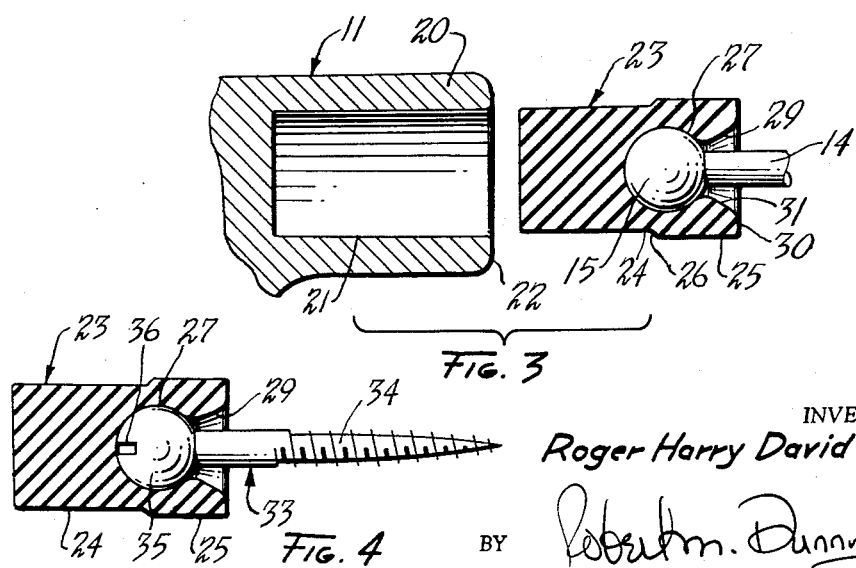
INVENTOR
Roger Harry David
BY Robert M. Dunning
ATTORNEY

United States Patent Office 2,921,808
Patented Jan. 19, 1960

2,921,808

ADJUSTABLE CONNECTIONS

Roger Harry David, St. Paul, Minn.

Application October 30, 1956, Serial No. 619,253

7 Claims. (Cl. 287—12)

This invention relates to an improvement in adjustable connections and deals particularly with a type of ball and socket joint which may be used for supporting rear view mirrors or other objects which must be angularly adjusted relative to a fixed supporting bracket.

Various types of adjustable connectors have been produced for connecting two members so that one may be angularly adjusted relative to the other. For example, rear view mirrors of the type used in automobiles and the like are usually provided with a ball and socket joint in which spring pressure is exerted upon the ball to hold it in an adjusted position in its socket. Devices of this type usually require, in addition to the ball and its socket, some type of pressure or bearing washer, some type of spring, and some type of retaining means for retaining the spring in an adjusted position. As a result, these connectors are somewhat costly to produce and are also somewhat costly to assemble. It is an object of the present invention to provide a connector which is relatively inexpensive to produce and to assemble and which has other features of advantage over previous devices of this type.

A feature of the present invention resides in the provision of a connector which includes an elongated socket into which a resilient plug may be inserted. The resilient plug is formed with a socket communicating with one end thereof and within which a ball may be adjustably supported. An arm is provided on the ball extending through the open end of the socket and designed for connection with the element to be adjustably supported. The ball is resiliently supported within the plug and the pressure upon the ball is sufficient to hold the arm in an adjusted position.

A feature of the present invention resides in the provision of a plug of resilient material which substantially corresponds in diameter to the internal diameter of an elongated socket into which the plug is to be inserted. A generally spherical socket is provided in one end of the plug communicating with the end of the plug by an axially extending passage. The end of the plug encircling this passage is of increased external diameter. Accordingly, as the plug is inserted into the socket, the end of the plug outwardly of the spherical socket is compressed in a manner to exert a constant pressure against the ball contained therein. This pressure is sufficient to hold the ball and the arm supported thereby in an adjusted position.

A feature of the present invention resides in the provision of an adjustable connection including a resilient plug which is elongated and which is provided with a generally spherical socket spaced from one end thereof. An axial passage connects the spherical socket to the adjoining end of the plug. The passage is normally of smaller diameter than the spherical socket. The plug is normally molded in finished form and is sufficiently resilient so that the spherical portion of the mold forming the spherical socket may be removed through the passage and to remove the plug from the form.

A further feature of the invention as described above lies in the fact that the ball which forms a part of the ball and socket joint is of approximately the same diameter as the socket into which it is placed and may be inserted into the socket through the axial passage just as the core of the mold is removed when the casting process is completed. Thus the ball may be inserted into the socket by an axial force pushing the ball through the smaller diameter passage. However, as the plug is inserted into its elongated socket, the portion of the plug outwardly of the axial passage is compressed making removal of the ball through the passage virtually impossible without removing the plug from its socket. If desired, the plug may be cemented in place in the socket although in actual practice when the plug is in place it is extremely difficult to remove it from the socket.

A further feature of the present invention lies in the fact that during the assembly of the apparatus, the ball is first inserted into the socket in the plug, and the plug is then inserted into its socket. As the major portion of the length of the plug is of approximately the same diameter as the socket, the plug may be inserted easily up to the enlarged diameter portion thereof. By exerting an axial force upon the ball arm or upon the plug socket, the enlarged diameter portion of the plug may be inserted into the entrance end of the socket completing the assembly operation. As a result the entire assembly may be accomplished through the use of a small hand operated press or a similar means.

These and other objects and novel features of the present invention will be more clearly and fully set forth in the following specification and claims.

In the drawings forming a part of the specification:

Figure 1 is a perspective view of a rear view mirror of a type used on boats, vehicles or the like illustrating a typical use of the adjustable connection.

Figure 2 is a side elevational view of a portion of the structure shown in Figure 1, a part of the supporting bracket being broken away to show the internal construction.

Figure 3 is an enlarged sectional view through the bracket and plug before the plug is inserted into the bracket socket.

Figure 4 is a view similar to Figure 3 showing a different type of fastening means engaged in the plug socket.

Figure 1 of the drawings illustrates a typical use for the adjustable connector. This illustrates a mirror 10, the rear surface of which is illustrated in the drawing, adjustably supported by a bracket 11. An adjustable arm 12 is adjustably supported by the bracket 11 and supports the mirror 10.

In the particular embodiment illustrated in Figures 1 to 3 of the drawings the supporting arm 12 includes a disc 13 which is cemented or otherwise secured to the rear surface of the mirror 10 or other object to be supported. An arm 14 extends normal to the disc 13 from the center thereof and connects the disc 13 to a ball end 15. The arm 14 preferably extends in a radial direction from the center of the ball 15.

The bracket 11 includes a base member 16 which is provided with apertures 17 through which an anchoring means such as screws or bolts may extend. A web 19 extends upwardly from the base 16 on a plane at substantially right angles to the plane of the base 16. The web 19 acts to support a generally horizontally extending barrel portion 20 having a substantially cylindrical socket 21 extending axially into the same from the end 22. While a certain type of bracket construction has been described which has been found useful for mounting on boats so that the driver of the boat may have a clear view behind the boat so that the position of persons water skiing behind the boat may at all times be observed, obviously the mirror can be used for other purposes and different types of brackets may be employed for supporting other types of objects.

A resilient plug 23 of a resilient plastic or rubber like material is normally engaged within the socket 21. The plug 23 is generally cylindrical in form including a smaller diameter portion 24 extending the major portion of the length of the plug and a larger diameter portion 25 at one end of the plug. The portions 25 and 24 are connected by an inclined shoulder 26.

A spherical socket 27 is molded within the plug near the large diameter end thereof. An outwardly flared or tapered passage 29 connects the spherical socket 27 with the large diameter end 30 of the plug. The small diameter end 31 of the passage 29 is of substantially smaller diameter than the spherical socket and the plug must normally be of sufficiently resilient material to expand to permit the portion of the mold forming the cylindrical socket to pass through the passage 29.

The small diameter portion 24 of the plug 23 is of approximately the same diameter as the interior surface of the socket 21. The ball 15 is of approximately the same diameter as the spherical socket 27. The mounting arm 12 is assembled into the socket 23 as indicated in Figures 2 and 3 of the drawings by exerting an axial force between the ball and the plug 23, the material forming the plug expanding sufficiently to permit the ball 15 to enter the passage 29 and pass into the socket 27.

To complete the assembly, it is only necessary to force the plug 23 into the elongated socket 21. This task is simplified by the fact that the major portion of the length of the plug is of approximately the same diameter as the socket 21. Thus the plug may be readily inserted into the socket 21 until the shoulder 26 engages the outer end 22 of the socket 21. By exerting an increased pressure to move the plug axially of the socket 21, the plug 23 will compress sufficiently to enter the socket 21.

The compression of the enlarged diameter portion 25 of the plug accomplishes two results. In the first place, when the end of the plug is compressed, inward pressure is exerted against the ball 15 holding the ball in any adjusted relation. The passage 29 is of sufficient size to permit the arm 14 to be adjusted through the desired angularity. Secondly, the compression of the plug confines the plug and makes it virtually impossible to withdraw the ball 15 from the socket 27. Finally, the compression of the plug causes an outward force to be exerted against the walls of the socket 21 holding the plug firmly in its socket.

In Figure 4 of the drawings a slightly modified form of the mounting arm is illustrated. The plug 23 is similar to that previously described and is accordingly provided with similar identifying numerals. The mounting arm 33 includes a threaded shank 34 which may be either in the form of a tapered screw as illustrated or a machine screw. This shank 34 is provided with a generally spherical head 35 which may if desired be slotted as indicated at 36 for attachment of the screw or bolt to a member to be supported.

The head 35 fits within the plug socket 27 and adjustably supports the shank 34 in the manner which will be obvious from the previous description.

Not only can the adjustable support be reasonably constructed and produced, but also the cost of assembly is extremely low. As there is very little wear upon the plug, and as the plug is formed of resilient material which is extremely resistant to wear, the plug will firmly grip the ball for a considerable length of time and will hold the mounting arm at a desired angularity relative to the bracket socket.

In accordance with the patent statutes, I have described the principles of construction and operation of my improvement in adjustable connections, and while I have endeavored to set forth the best embodiment thereof, I desire to have it understood that changes may be made within the scope of the following claims without departing from the spirit of my invention.

I claim:
1. An adjustable connector including a member having an elongated socket, an elongated plug of resilient material, a spherical socket in said plug spaced from one end thereof, an axial passage extending from said spherical socket to said one end of said plug, a ball having a radially extending arm attached thereto engaged in said spherical socket with said arm extending through said axial passage, said arm being of smaller diameter than said ball, the other end of said plug being shaped to fit said socket in said bracket means, the portion of said plug encircling said passage being of larger external dimensions than the dimensions of said socket in said bracket means, said one end of said plug being normally compressed when said plug is engaged in said socket.

2. An adjustable connector including a member having an elongated substantially cylindrical socket therein, a resilient plug of generally cylindrical form having one end of substantially the same diameter as said socket and having its other end of somewhat larger diameter, a generally spherical socket intermediate the ends of said plug, a passage extending from said spherical socket in an axial direction through said enlarged diameter end of said plug, a ball within said socket in said plug, and an arm of smaller diameter than said ball extending radially from said ball through said axial passage, the portion of the plug encircling said axial passage being under compression when engaged in said socket in said bracket means.

3. The construction described in claim 2 and in which said passage is outwardly flared.

4. A connector including a body having a socket therein, a plug of resilient material engaged in said socket, said plug having an enlarged cavity spaced from the ends thereof and a passage of smaller dimensions than said cavity connecting said cavity to one end of said plug, said plug being of external dimension substantially equal to those of said socket throughout most of its length and being of normally larger dimension than the internal dimensions of the socket in the portion encircling said passage, whereby the portion of the plug encircling said passage is under greater compression than the remainder of said plug when engaged in said socket, and a connected member having an enlarged end snugly engaged within the enlarged cavity and a neck of smaller diameter than said enlarged end connected to said end extending through said passage.

5. The structure of claim 4 and in which said enlarged cavity and said enlarged end of said connected member are substantially cylindrical.

6. The structure of claim 4 and in which the socket is substantially cylindrical, and in which the plug is also substantially cylindrical and the large dimensioned portion is also cylindrical but normally of larger diameter.

7. The structure of claim 6 and in which the smaller and larger diameter portions of said plug are connected by an inclined shoulder.

References Cited in the file of this patent

UNITED STATES PATENTS

| | | |
|---|---|---|
| 1,730,799 | Bowes | Oct. 8, 1929 |
| 2,167,962 | Sovis | Aug. 1, 1939 |
| 2,292,675 | Thiry | Aug. 11, 1942 |
| 2,440,670 | Kaemmerling | Apr. 27, 1948 |
| 2,553,689 | Tuck | May 22, 1951 |
| 2,639,496 | Hartzell | May 26, 1953 |
| 2,696,964 | Ringwald | Dec. 14, 1954 |

FOREIGN PATENTS

| | | |
|---|---|---|
| 793,857 | France | Feb. 3, 1936 |
| 1,101,076 | France | Sept. 27, 1955 |